(12) United States Patent
Baeckler (10) Patent No.: US 9,251,305 B1
(45) Date of Patent: Feb. 2, 2016

(54) METHOD AND APPARATUS FOR ANALYZING STRUCTURED CELL CANDIDATES FOR STRUCTURED APPLICATION SPECIFIC INTEGRATED CIRCUITS

(75) Inventor: Gregg William Baeckler, San Jose, CA (US)

(73) Assignee: Altera Corporation, San Jose, CA (US)

( * ) Notice: Subject to any disclaimer, the term of this patent is extended or adjusted under 35 U.S.C. 154(b) by 2099 days.

(21) Appl. No.: 12/287,993

(22) Filed: Oct. 14, 2008

(51) Int. Cl.
*G06F 17/50* (2006.01)
(52) U.S. Cl.
CPC ................... *G06F 17/5068* (2013.01)
(58) Field of Classification Search
CPC .................................................. G06F 17/5068

USPC .......................................................... 716/132
See application file for complete search history.

(56) References Cited

U.S. PATENT DOCUMENTS

| | | | |
|---|---|---|---|
| 6,629,300 B1* | 9/2003 | Otake | 716/122 |
| 7,030,651 B2* | 4/2006 | Madurawe | 326/41 |
| 7,079,579 B2* | 7/2006 | Han et al. | 375/240.16 |
| 7,137,092 B2* | 11/2006 | Maeda | 716/53 |
| 7,937,256 B2* | 5/2011 | Tseng et al. | 703/14 |

* cited by examiner

*Primary Examiner* — Thuan Do
(74) *Attorney, Agent, or Firm* — L. Cho (57) ABSTRACT

A method for evaluating structured cells is disclosed. Functions that may be implemented by a candidate structured cell are identified. A cell library having a subset of functions that may be implemented by the structured cell is generated. A system is implemented on a target device using the functions in the cell library. The system on the target device is evaluated.

23 Claims, 8 Drawing Sheets

METHOD AND APPARATUS FOR ANALYZING STRUCTURED CELL CANDIDATES FOR STRUCTURED APPLICATION SPECIFIC INTEGRATED CIRCUITS

TECHNICAL FIELD

The present invention relates to structured application specific integrated circuits (ASICs). More specifically, the present invention relates to a method and apparatus for analyzing structured cell candidates when designing structured ASICs.

BACKGROUND

Structured ASICs, also referred to as platform ASICs, may be used as target devices to implement systems. The pre-defined metal layers of structured ASICs helps reduce manufacturing cycle time when compared to using full custom ASICs. Pre-characterization of what is on silicon also helps reduce design cycle time may be reduced when compared to using full custom ASICs.

In a structured ASIC design, logic mask-layers of a device are pre-defined by the ASIC vendor. Design differentiation and customization are achieved by creating custom metal layers that create custom connections between predefined lower-layer logic elements. Structured ASIC technology bridges the gap between field programmable gate arrays (FPGAs) and full custom ASIC designs. Since a smaller number of chip layers must be custom produced compared to a full custom ASIC design, structured ASIC designs have smaller non-recurring expenditures than full custom ASIC or full custom chips which require a full mask set be produced for every design.

Structured cells constructed from a collection of logic transistors on a structured ASIC may be used to construct logic for the system. The structured cells allow flexible functionality such that a single structured cell or a combination of structured cells may be used to implement any logic required. Only the structured cells needed to implement the system are assembled together, which optimizes the structured cell use. Unused areas of a structured cell logic fabric may be powered down, resulting in power savings.

In the past, when structured ASIC designers designed the architecture of the structured cells, functions from existing system designs were transformed to binary decision diagrams and implemented by the primary components of simple structured cells for evaluation. This approach, however, approximated the capacity of the structured cell with the primary components of the structured cell and underutilized the capability of the other components of the structured cell.

SUMMARY

According to an embodiment of the present invention, a method and apparatus for analyzing structured cell candidates when designing structured ASICs is described. For each design of a cell candidate, logic functions are built from one or more of the cell candidates. The logic functions supported by each cell candidate may be recorded to generate a library of composite cells for a computer aided design tool to use. In order to determine the efficiency of the cell candidates, each of the cell candidates may be evaluated based upon the number of cells required to implement a system, the speed of the system, or other criteria. Cell candidates capable of implementing more functions would typically require fewer cells to implement a system than cell candidates capable of implementing fewer functions, and thus be determined to be more efficient.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
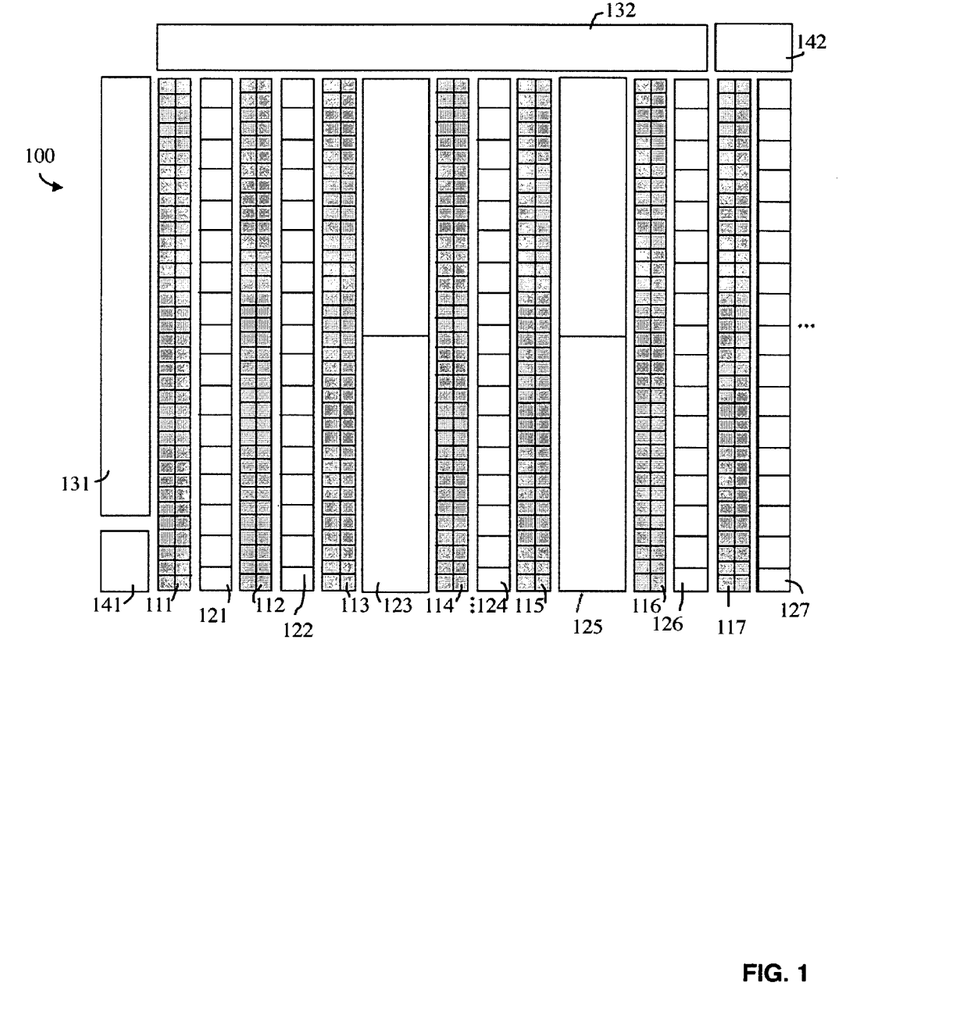
FIG. 1 illustrates an exemplary target device according to an embodiment of the present invention.

FIG. 1 illustrates an exemplary target device according to an embodiment of the present invention. In this embodiment, the target device is a structured ASIC 100. The structured ASIC 100 is a hybrid device that includes a number of pre-defined or pre-built layers used to define logic fabric and IP blocks, and a number of customizable design-specific layers that may be used to provide connectivity in the logic fabric and to/from IP blocks.

According to one embodiment, the structured ASIC 100 includes a plurality of structured cells. A structured cell is a basic building block used in the structured ASIC 100. Each structured cell includes the same basic programmable circuitry. One or more structured cells may be used to implement logic such as combinational, sequential circuits, and digital signal processor block functions. Arrays of structured cells are shown as 111-117.

The structured ASIC 100 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected arrays of structured cells or located individually or in pairs within the structured ASIC 100. Columns of memory blocks are shown as 121-127.

The structured ASIC 100 includes a plurality of input/output elements (IOEs) 131 and 132. Each IOE feeds an I/O pin (not shown) on the structured ASIC 100. The IOEs are located near the end of structured array columns around the periphery of the structured ASIC 100. Each IOE includes a bidirectional I/O buffer and a plurality of registers for registering input, output, and output-enable signals. When used with dedicated clocks, the registers provide performance and interface support with external memory devices.

The structured ASIC 100 includes dedicated clock networks (not shown) that may be organized into hierarchical clock structure to provide unique clock domains within the target device. The structured ASIC 100 also includes a plurality of phase lock loops 141 and 142 provide closed-loop frequency control.

FIG. 1 illustrates an exemplary embodiment of a portion of a target device. It should be appreciated that a system may include one or more target devices, such as that illustrated in FIG. 1, cascaded together. It should also be appreciated that a target device may include circuitry arranged in a manner different than that illustrated in FIG. 1 and that a target device may include resources other than those described with reference to the target device 100.

Figure 2:
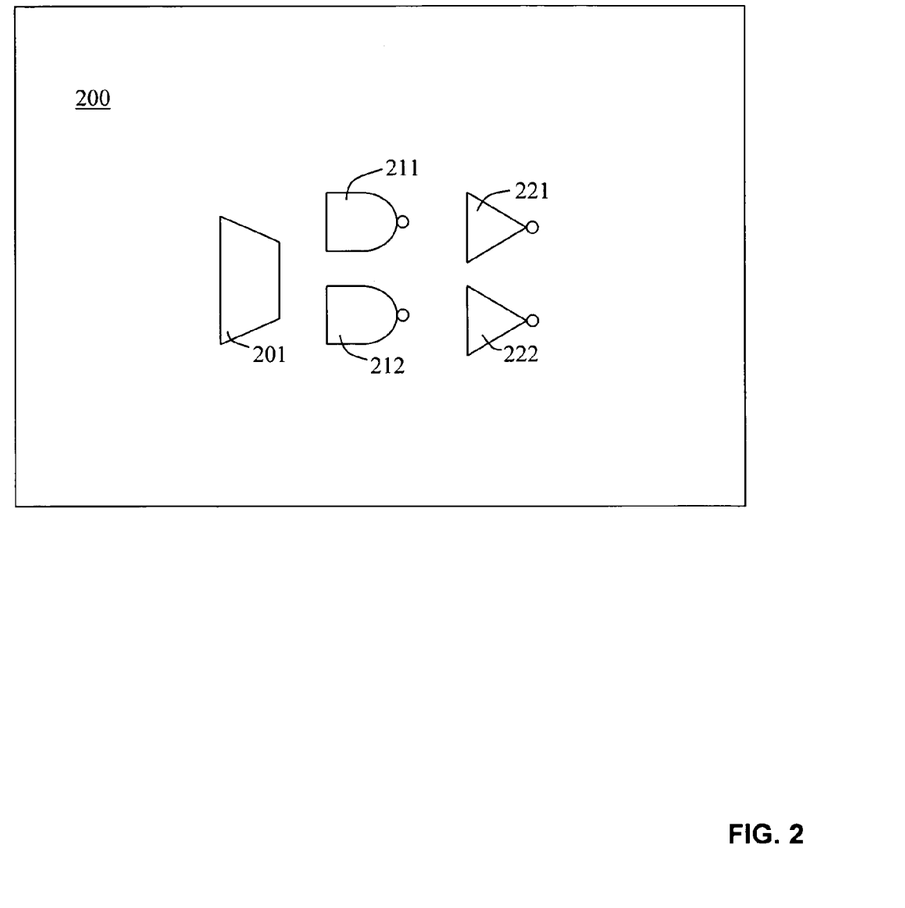
FIG. 2 illustrates an exemplary candidate structured cell according to an embodiment of the present invention.

FIG. 2 illustrates an exemplary candidate structured cell 200 according to an embodiment of the present invention. When designing a structured ASIC such as the one illustrated in FIG. 1, it is desirable to utilize structured cells with components which provide the structured ASIC with sufficient flexibility to implement a large number of functions while maintaining a size that is manageable and that does not include types of components or quantities of components that would be under-utilized in the structured cells. Thus, when evaluating a structured cell design for implementation on a structured ASIC, a number of candidates may be considered. FIG. 2 illustrates a candidate structured cell 200 having a multiplexer 201, two NAND gates 211 and 212, and two inverters 221 and 222.

It should be appreciated that the structured cell 200 may include additional/fewer electrical components and that the electrical components may be of other types. For example, according to an embodiment of the present invention, the structured cell 200 may include 1-4 multiplexers, 2-4 NAND gates and/or NOR gates, and 2-6 inverters.

Figure 3:
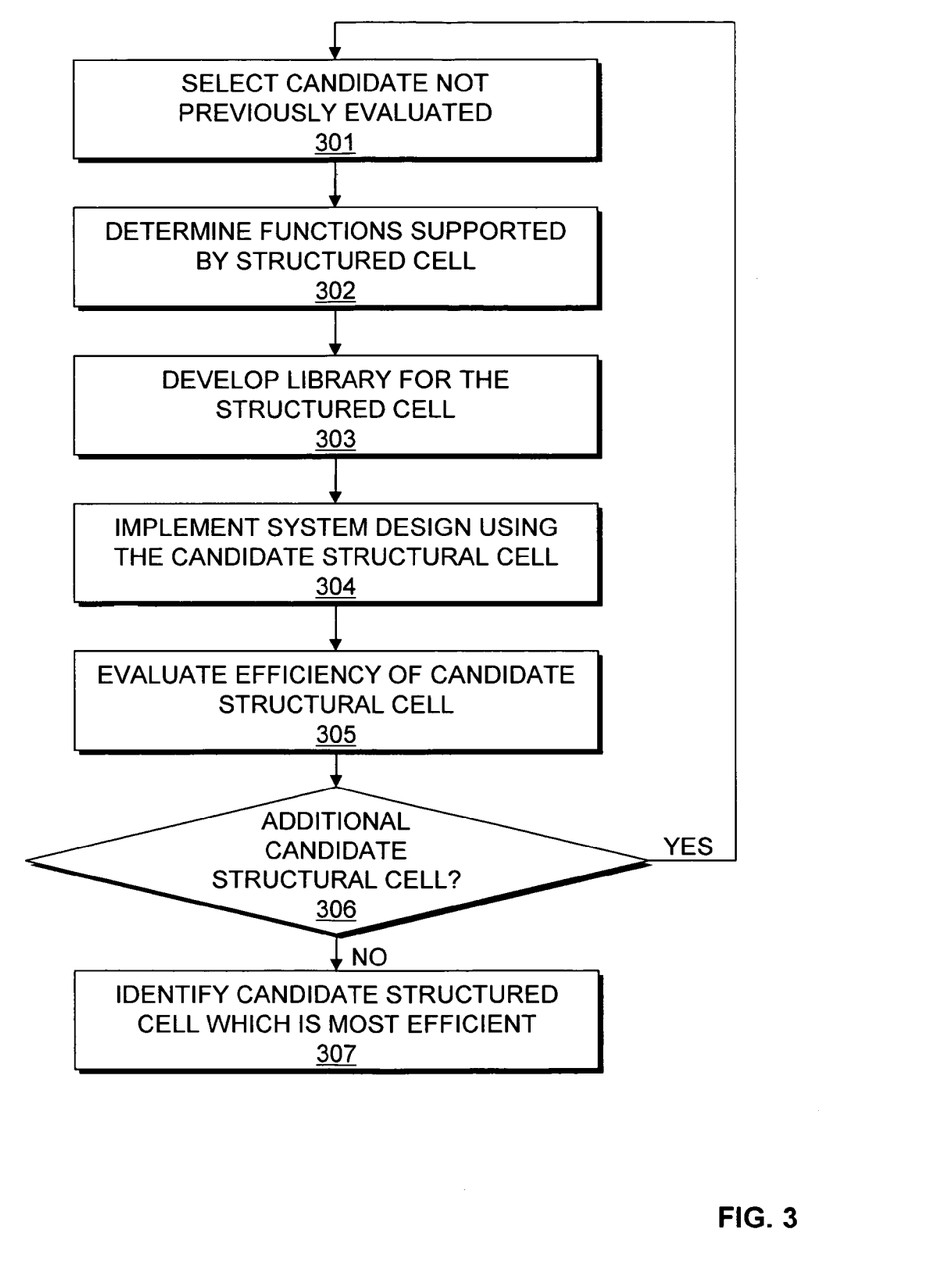
FIG. 3 is a flow chart that illustrates a method for analyzing candidate structured cell according to an embodiment of the present invention.

FIG. 3 is a flow chart that illustrates a method for analyzing candidate structured cells according to an embodiment of the present invention. At 301, a candidate for a structured cell that has not been previously been evaluated is selected. The candidate includes a unique combination of component type and number.

At 302, the functions supported by the candidate for the structured cell are determined. According to an embodiment of the present invention, simulations may be performed to identify the functions that may be implemented using the candidate for the structured cell.

At 303, a structured cell library is generated. According to an embodiment of the present invention, the structured cell library identifies functions that may be implemented by the structured cell and how to configure the structured cell to implement the function. The structured cell library may be used by a computer aided design program to program the structured cells in a structured ASIC to implement functions in a system design. In this embodiment, the functions stored in the structured cell library are a subset of the functions identified by the procedure described with reference to 302.

At 304, a system design is implemented on a structured ASIC which uses the candidate structured cell. The candidate structured cells are programmed to perform functions required by the system design. The functions required by the system design may be implemented by predetermined structured cell configurations in the structured cell library. Alternatively, the functions may be built dynamically using one or more structured cells. According to an embodiment of the present invention, the system design is implemented on the structured ASIC using a electronic design automation computer aided design (CAD) tool that performs synthesis, placement, and routing of the system design on the structured ASIC.

At 305, the efficiency of the candidate cell structure is evaluated. This may be achieved by evaluating the implementation of the system design on the structured ASIC by determining the speed of the system, a number of structured cell required for implementing the system, and/or other properties or characteristic of the system.

At 306, it is determined whether additional candidate structure cells are to be evaluated. If additional candidate structure cells are to be evaluated, control returns to 301. If no additional candidate structure cells are to be evaluated, control proceeds to 307.

At 307, the candidate structured cell that is most efficient in implementing the system design is identified. This candidate structured cell is selected to be implemented in the structured ASIC.

Embodiments of the present invention will allow architecture designers of a structured ASIC to define an efficient structured cell for the structured ASIC. The cell may include a set of primary inputs, logic gates, and outputs. Although many components may be used to define a structured cell capable of implementing some set of functions, it is desirable to define a structured cell that is capable to implement a largest number of functions. A subset of the functions found may be stored in a structured cell library. Structured cell configurations from this library may be used by CAD tools to implement user provided logic with the goal to minimize silicon cost of user provided logic. Embodiments of the present invention provides a procedure for determining the functions that may be implemented by a cell candidate and given a set of implementable functions, which should be stored in a structured cell library to most efficiently implement user logic in a system design.

Figure 4:
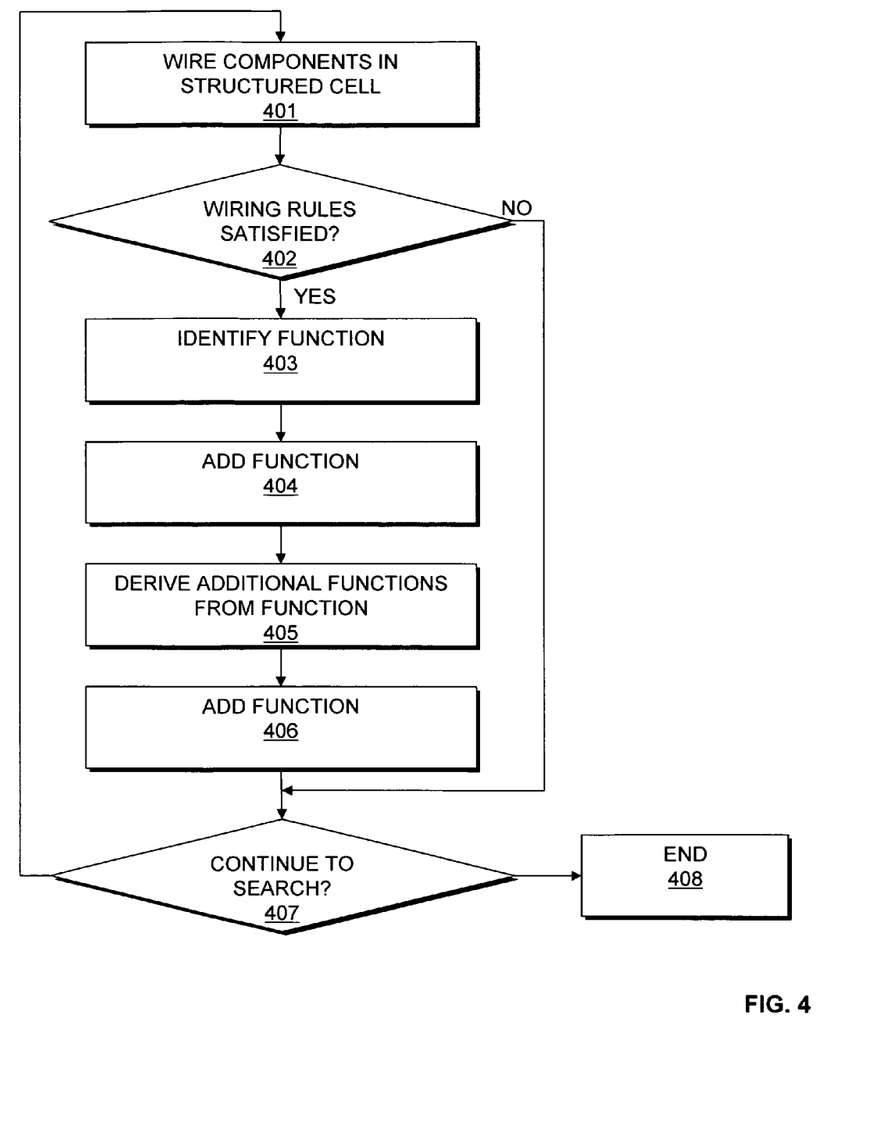
FIG. 4 is a flow chart that illustrates a method for enumerating logic functions of a structured cell according to an embodiment of the present invention.

FIG. 4 is a flow chart that illustrates a method for enumerating logic functions of a (candidate) structured cell according to an embodiment of the present invention. The procedure illustrated in FIG. 4 may be used to implement procedure 302 illustrated in FIG. 3. At 401, components in a structured cell are randomly wired. According to an embodiment of the present invention, one or more components in the structured cell are connected together to form a circuit.

At 402, it is determined whether the circuit satisfies a set of wiring rules. According to an embodiment of the present invention, the wiring rules may include electrical and integrated circuit rules that govern legal connections within a structured cell. The rules may include the following directives. Use up to 6 primary inputs. Assign names to the inputs in a consistent manner to reduce duplicates. When the components in a structured cell includes a multiplexer, NAND gate, and inverter, data driven to the multiplexer must be driven from the NAND gate or the inverter. Data driven to the multiplexer must not be fed by one of the primary inputs. An output of the structured cell must be fed by the NAND gate or the inverter. There should be a single output for the structured cell. Vcc and ground can be connected anywhere on the structured cell. Double driving and combinational loops are not permitted. It should be appreciated that additional or other types of wiring rules may be applied. If the circuit satisfies the wiring rules, control proceeds to 403. If the circuit does not satisfy the wiring rules, control proceeds to 407.

At 403, the function associated with the circuit is identified. According to an embodiment of the present invention, simulation is performed on the circuit to determine the output values given a combination of possible input values. Alternatively, a binary constructive method may be used to determine output values for given input values to the circuit. A truth table describing the function may be derived from the simulation or binary constructive method. The truth table may be rotated to standardize its representation. According to an embodiment of the present invention, if any oscillation is detected to indicate that the function is unstable, the function/circuit is discarded.

At 404, if the truth table is unique and has not previously been generated, the function and truth table is added to a list and stored.

At 405, related functions are derived from the function analyzed at 403. According to an embodiment of the present invention, systematic changes are made to the original function, such as changing primary inputs to constants, adding an inverter, and other changes. The procedures described with reference to 403 and 404 may be applied to the newly derived functions.

At 406, for the newly derived functions, if their truth tables are unique and have not been previously generated, the functions and truth tables are added to the list and stored.

At 407, it is determined whether the procedure should continue to perform random wiring to identify additional functions. According to an embodiment of the present invention, a time limit, maximum number of iterations, maximum number of identified functions, or other metric may be used to determine whether the procedure should continue. If it is determined that the procedure continue, control returns to 401. If it is determined that the procedure should not continue, control proceeds to 408.

At 408, control terminates the procedure.

Figure 5:
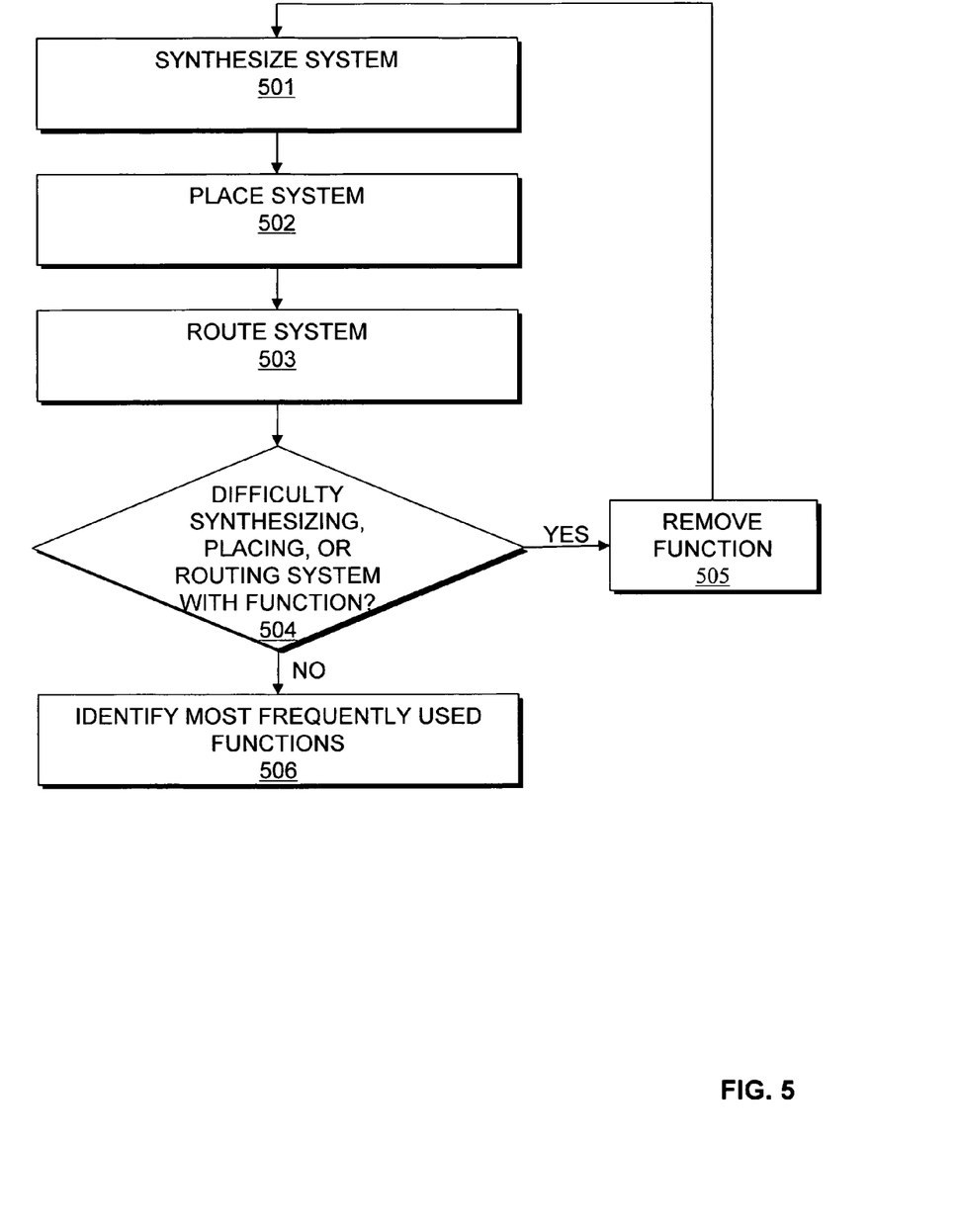
FIG. 5 is a flow chart that illustrates of creating a cell library according to an embodiment of the present invention.

FIG. 5 is a flow chart that illustrates of creating a cell library according to an embodiment of the present invention. The procedure described with reference to FIG. 5 may be used to implement 303 illustrated in FIG. 3. At 501, a system design is synthesized. Synthesis includes generating a logic design of the system to be implemented by the target device. According to an embodiment of the present invention, synthesis generates an optimized logical representation of the system from a HDL design definition. The optimized logical representation of the system may include a representation that has a minimized number of functional blocks and registers, such as logic gates and logic elements, required for the system. Synthesis also includes mapping the optimized logic design. Mapping includes determining how to implement logic gates and logic elements in the optimized logic representation with specific resources on the target device. In the case of a structured ASIC, the resources available include functions that may be implemented by structured cells. These functions may have been defined using the procedure described with reference to FIG. 4. According to an embodiment of the present invention, a netlist is generated from mapping. This netlist may be an optimized technology-mapped netlist generated from the HDL.

At 502, the mapped logical system design is placed. Placement works on the optimized technology-mapped netlist to produce a placement for each of the functional blocks. According to an embodiment of the present invention, for a target device that is a structured ASIC, placement includes fitting the system on the integrated circuit by determining which resources on the integrated circuit are to be used for specific logic elements, and other functional blocks.

At 503 the system is routed. Routing involves determining how to connect the functional blocks in the system. According to an embodiment of the present invention, a cost function may be used to generate a cost associated with each routing option. The cost function may take into account, delay, capacitive loading, cross-sink loading, power, and/or other criteria.

At 504, it is determined whether any of the functions selected in implementing a functional block was difficult to synthesize, place, or route. Difficulties encountered may involve illegalities in synthesis, placement, or routing, or the failure to comply with system, target device, or user requirements such as area and timing. According to an embodiment of the present invention, one difficulty includes using too much routing wires or using routing wires in a pattern that causes a physical obstruction in a metal layer ("routing blockage"). If a function selected encountered difficulties in synthesis, placement, or routing, control proceeds to 505. If no difficulty was encountered in synthesis, placement, or routing the functions selected, control proceeds to 506.

At 505, the function(s) identified as being a source of difficulty is removed from the system design and is removed from a list of available functions that the structured cell can implement. Control returns to 501 to perform synthesis using another function.

At 506, functions that are most frequently used in the system design are identified. The available functions that a structured cell can implement that are most frequently used are selected to be stored in a structured cell library. It should be appreciated that the system design referred to with reference to the procedure in FIG. 5 may be a system design different than the system design referenced in FIG. 3. The system design synthesized, placed, and routed may be a test system used for the purpose of generating a structured cell library.

Figure 6:
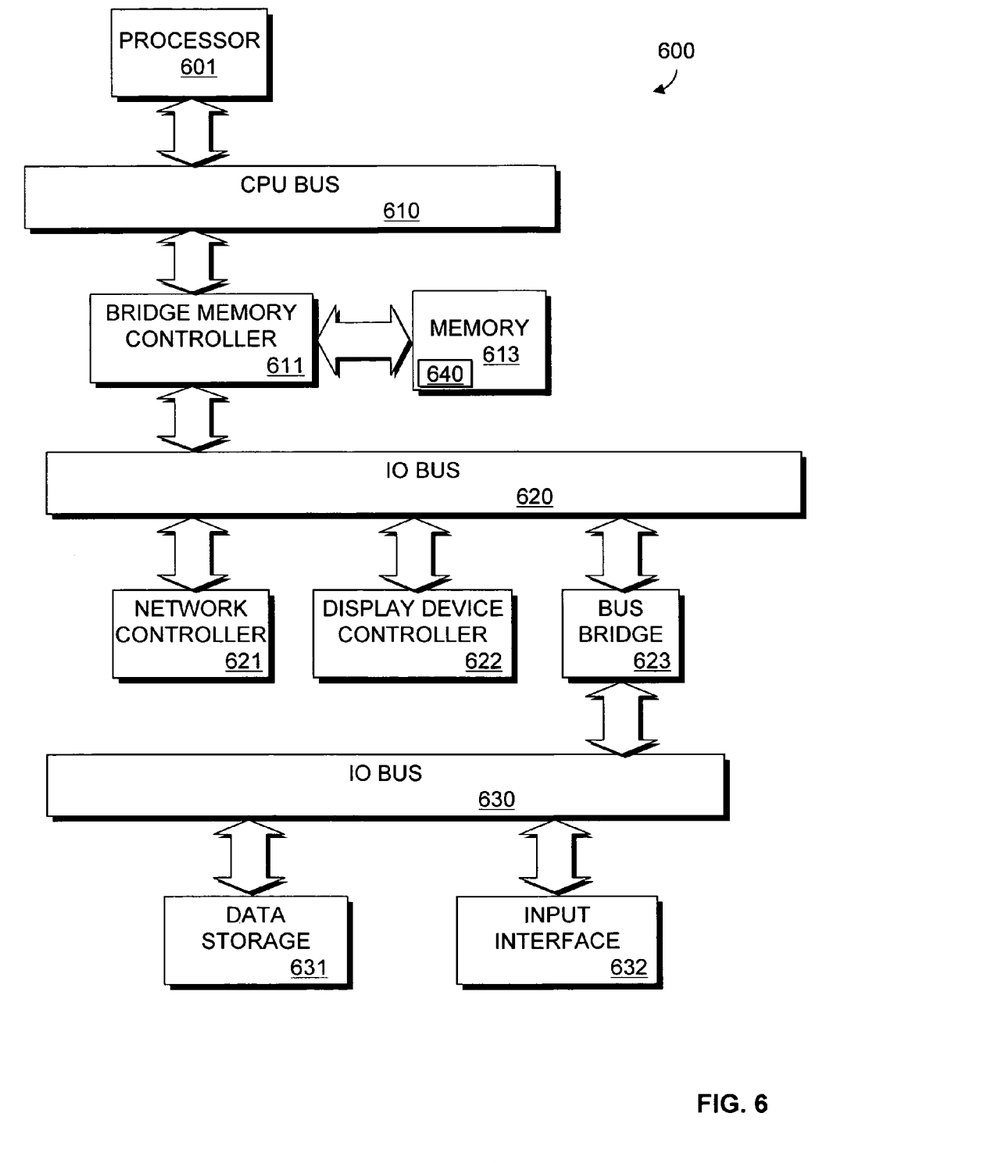
FIG. 6 illustrates a computer system implementing an embodiment of the present invention.

FIG. 6 is a block diagram of an exemplary computer system 600 in which an example embodiment of the present invention resides. The computer system 600 includes one or more processors that process data signals. As shown, the computer system 600 includes a processor 601. The processor 601 may be multi-core processors with multiple processor cores on each chip. The processor 601 is coupled to a CPU bus 610 that transmits data signals between processor 601 and other components in the computer system 600. In an alternate embodiment, an nth processor is coupled to the CPU bus 610 where n may be any number. Each of the processors or processor cores in the computer system 600 may execute its own thread. Each thread may run a different part of one or more or the same software program in parallel with other threads.

The computer system 600 includes a memory 613. The memory 613 may store instructions and code represented by data signals that may be executed by the processor 601. A bridge memory controller 611 is coupled to the CPU bus 610 and the memory 613. The bridge memory controller 611 directs data signals between the processor 601, the memory 613, and other components in the computer system 600 and bridges the data signals between the CPU bus 610, the memory 613, and a first IO bus 620.

The first IO bus 620 may be a single bus or a combination of multiple buses. The first IO bus 620 provides communication links between components in the computer system 600. A network controller 621 is coupled to the first IO bus 620. The network controller 621 may link the computer system 600 to a network of computers (not shown) and supports communication among the machines. A display device controller 622 is coupled to the first IO bus 620. The display device controller 622 allows coupling of a display device (not shown) to the computer system 600 and acts as an interface between the display device and the computer system 600.

A second IO bus 630 may be a single bus or a combination of multiple buses. The second IO bus 630 provides communication links between components in the computer system 600. A data storage device 631 is coupled to the second IO bus 630. An input interface 632 is coupled to the second IO bus 630. The input interface 632 allows coupling of an input device to the computer system 600 and transmits data signals from an input device to the computer system 600. A bus bridge 623 couples the first IO bus 620 to the second IO bus 630. The bus bridge 623 operates to buffer and bridge data signals between the first IO bus 620 and the second IO bus 630. It should be appreciated that computer systems having a different architecture may also be used to implement the computer system 600.

A structured cell analyzer 640 may reside in memory 613 and be executed by one or more of the processors 601 and 605. The structured cell analyzer 640 may analyze a structured cell candidate by building logic functions with the structured cell candidate. The logic functions supported by each cell candidate may be evaluated and recorded to generate a library of composite cells for a CAD tool to use. In order to determine the efficiency of a structured cell candidate, the structured cell candidates may be further evaluated based upon the number of cells required to implement a system, the speed of the system, and other criteria.

Figure 7:
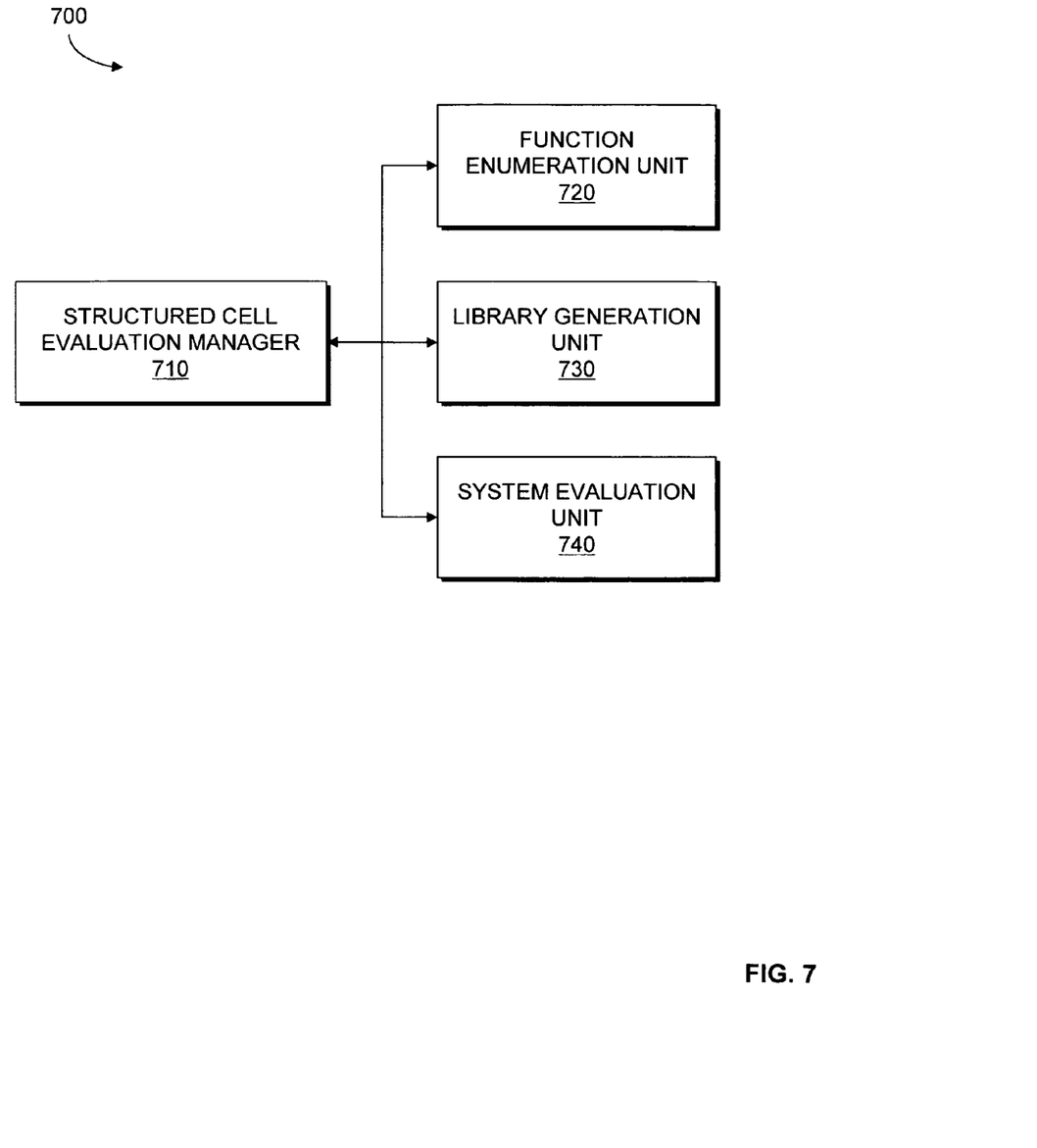
FIG. 7 illustrates a structured cell designer according to an embodiment of the present invention.

FIG. 7 illustrates a structured cell analyzer 700 according to an embodiment of the present invention. FIG. 7 illustrates modules implementing an embodiment of the system designer 700. According to one embodiment, the modules represent software modules and system design may be performed by a computer system such as the one illustrated in FIG. 6 executing sequences of instructions represented by the modules shown in FIG. 7. Execution of the sequences of instructions causes the computer system to support performing analysis on a structured cell as will be described hereafter. In alternate embodiments, hard-wire circuitry may be used in place of or in combination with software instructions to implement embodiments of present invention. Thus, embodiments of present invention are not limited to any specific combination of hardware circuitry and software. The structured cell analyzer 700 includes a structured cell evaluation manager 710. The structured cell evaluation manager 710 is connected to and transmits data between the components of the structured cell analyzer 700.

The structured cell analyzer 700 includes a function enumeration unit 720. The function enumeration unit 720 identifies the functions supported by a structured cell. According to an embodiment of the present invention, simulations may be performed to identify the functions that may be implemented using the candidate for the structured cell. The function enumeration unit 720 may perform the procedures illustrated in FIG. 4.

The structured cell analyzer 700 includes a library generation unit 730. The library generation unit 730 generates a structured cell library that identifies functions that may be implemented by the structured cell and how to configure the structured cell to implement the function. The structured cell library may be used by a computer aided design program to program the structured cells in a structured ASIC to implement functions in a system design. In one embodiment, the functions stored in the structured cell library are a subset of the functions identified by the function enumeration unit 720. The library generation unit 730 may perform the procedures illustrated in FIG. 5.

The structured cell analyzer 700 includes a system evaluation unit 740. According to an embodiment of the present invention, the system evaluation unit 740 implements the system design on a structured ASIC which uses the structured cell. The structured cells on the structured ASIC are programmed to perform functions required by the system design. The functions required by the system design may be implemented by predetermined structured cell configurations in the structured cell library. Alternatively, the functions may be built dynamically using one or more structured cells. According to an embodiment of the present invention, the system design is implemented on the structured ASIC using an electronic design automation CAD tool that performs synthesis, placement, and routing of the system design on the structured ASIC. The system evaluation unit 740 evaluates the efficiency of the structured cell by determining the speed of the system, a number of structured cells required for implementing the system, and/or other properties or characteristic of the system as implemented on the structured ASIC.

The structured cell evaluation manager 710 may utilize the information determined by the structured cell analyzer 700 to select a candidate structured cell which implements the system most efficiently as the structured cell for the structured ASIC.

Figure 8:
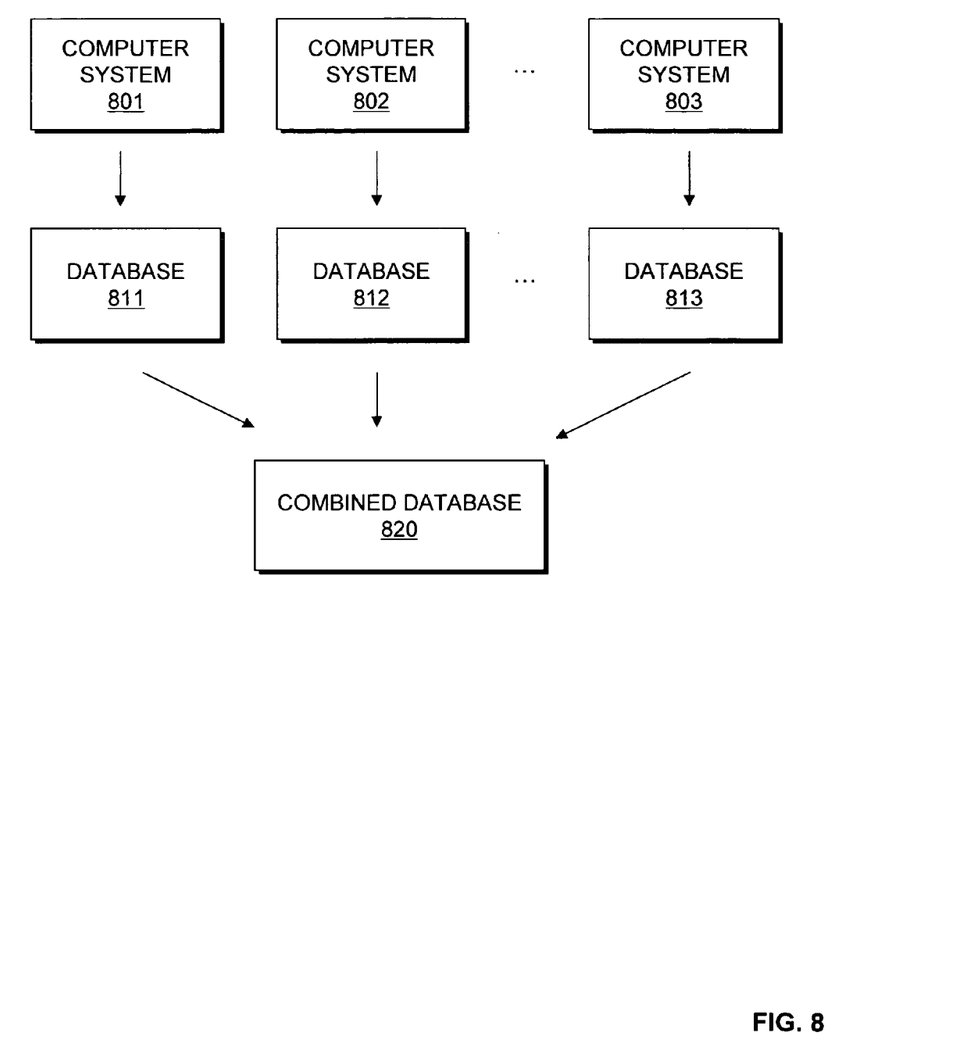
FIG. 8 is a block diagram illustrating a network of computer systems implementing an embodiment of the present invention.

FIG. 8 is a block diagram illustrating a network of computer systems 800 implementing an embodiment of the present invention. The network of computer systems 800 may be used to perform one or more of the procedures illustrated in FIG. 3. For example, since the function search of procedure 302 is randomized, this procedure may be parallelized and the results obtained may be merged for a faster more thorough coverage. The network of computer systems 800 includes a first computer system 801, a second computer system 802, and an nth computer system 803, where n may be any number. The computer system 700 illustrated in FIG. 7 may be used to implement any one of the computer systems 801-803. Each of the computer systems in the network of computer systems 800 may be used to perform the procedure illustrated in FIG. 4 to create a database of functions. Databases 811-813 correspond to computer systems 801-803, respectively. The databases 811-813 may be combined to form combined database 820.

Embodiments of the present invention work ideally for complex structured cell candidates which are not realistically approximated by BDD or other structural matching heruristics. Utilizing a parallel search capability allows for a faster, more robust coverage within a fixed amount of time. As a result, a larger number of functions are identified which produces a structured cell library with more relevant functions.

FIGS. 3-5 are flow charts illustrating methods according to embodiments of the present invention. The techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Embodiments of the present invention may be provided as a computer program product, or software, or firmware that may include an article of manufacture on a machine accessible or a machine-readable medium having instructions. The instructions on the machine accessible medium may be used to program a computer system or other electronic device. The machine accessible medium may include, but is not limited to, floppy diskettes, optical disks, CD-ROMs, magneto-optical disks, or other type of media/machine accessible medium suitable for storing or transmitting electronic instructions. The techniques described herein are not limited to any particular software configuration. They may find applicability in any computing or processing environment. The term "machine accessible medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, firmware and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for evaluating structured cells on a target device, the method comprising:
   identifying logic functions implementable by a candidate structured cell on the target device by connecting one or more components in the candidate structured cell together to generate a circuit, determining whether the circuit satisfies a set of wiring rules, determining output values for given input values for the circuit, and deriving a truth table that describes one or more logic functions implemented by the circuit from the determination, wherein the candidate structured cell comprises a plurality of gates configurable to be coupled together and the logic functions are implemented by connecting a subset of the plurality of gates together;
   generating a cell library with a subset of the logic functions implementable by the structured cell;
   implementing a system on the target device using the subset of logic functions in the cell library; and
   evaluating the system on the target device, wherein at least one of the identifying, generating, implementing, and evaluating is performed using a processor.

2. The method of claim 1, further comprising:
   standardizing the truth table; and
   storing the truth table.

3. The method of claim 1, wherein the set of wiring rules comprises a directive to use a predetermined number of inputs.

4. The method of claim 1, wherein the set of wiring rules comprises a directive to feed a multiplexer with a component other than a primary input.

5. The method of claim 1, wherein the set of wiring rules comprises a directive that forbids implementing a combinational loop.

6. The method of claim 1, wherein the set of wiring rules comprises a directive that forbids double driving to increase signal strength.

7. The method of claim 1, wherein generating a cell library with a subset of the logic functions implementable by the structured cell comprises:
   identifying logic functions that are used frequently in designing a test system; and
   storing the logic functions that are used frequently in the cell library.

8. The method of claim 1, wherein generating a cell library with a subset of logic functions implementable by the structured cell comprises:
   identifying problematic logic functions which are difficult to synthesize, place, or route on the target device; and
   storing logic functions other than the problematic logic functions in the cell library.

9. The method of claim 1, wherein evaluating the system on the target device comprises determining a speed of the system on the target device.

10. The method of claim 1, wherein evaluating the system on the target device comprises determining a number of structured cells required for implementing the system.

11. The method of claim 1, further comprising selecting a candidate structured cell which implements the system most efficiently as a structured cell for an structured application specific integrated circuit (ASIC).

12. A non-transitory computer-readable medium including sequences of instructions stored thereon for causing a computer to execute a method comprising:
   identifying logic functions implementable by a candidate structured cell on a target device, wherein the candidate structured cell comprises a plurality of gates configurable to be coupled together and the logic functions are implemented by connecting a subset of the plurality of gates together;
   generating a cell library with a subset of the logic functions implementable by the structured cell by identifying problematic logic functions which are difficult to synthesize, place, or route on the target device, and storing logic functions other than the problematic logic functions in the cell library;
   implementing a system on the target device using the subset of logic functions in the cell library; and
   evaluating the system on the target device.

13. The non-transitory computer-readable medium of claim 12, wherein identifying logic functions that are implementable by a candidate structured cell comprises:
   connecting one or more components in the candidate structured cell together to generate a circuit; and
   determining whether the circuit satisfies a set of wiring rules.

14. The non-transitory computer-readable medium of claim 13 further comprising:
   determining output values for given input values for the circuit; and
   deriving a truth table that describes one or more logic functions implemented by the circuit from the determination.

15. The non-transitory computer-readable medium of claim 14, further comprising:
   standardizing the truth table; and
   storing the truth table.

16. The non-transitory computer-readable medium of claim 13, wherein the set of wiring rules comprises a directive to use a predetermined number of inputs.

17. The non-transitory computer-readable medium of claim 13, wherein the set of wiring rules comprises a directive to feed a multiplexer with a component other than a primary input.

18. The non-transitory computer-readable medium of claim 13, wherein the set of wiring rules comprises a directive that forbids implementing a combinational loop.

19. The non-transitory computer-readable medium of claim 13, wherein the set of wiring rules comprises a directive that forbids double driving to increase signal strength.

20. The non-transitory computer-readable medium of claim 12, wherein generating a cell library with a subset of the logic functions implementable by the structured cell comprises:
   identifying logic functions that are used frequently in designing a test system; and
   storing the logic functions that are used frequently in the cell library.

21. The non-transitory computer-readable medium of claim 12, wherein evaluating the system on the target device comprises determining a speed of the system on the target device.

22. The non-transitory computer-readable medium of claim 12, wherein evaluating the system on the target device comprises determining a number of structured cells required for implementing the system.

23. A structured cell designer, comprising:

a function enumeration unit that identifies logic functions implementable by a candidate structured cell on a target device, wherein the candidate structured cell comprises a plurality of gates configurable to be coupled together and the logic functions are implemented by connecting a subset of the plurality of gates together;

a library generation unit that generates a cell library with a subset of the logic functions implementable by the structured cell by identifying problematic logic functions which are difficult to synthesize, place, or route on the target device, and storing logic functions other than the problematic logic functions in the cell library; and a system evaluation unit that evaluates a system on the target device implemented using the subset of the logic functions from the cell library.

* * * * *